(No Model.)  2 Sheets—Sheet 1.
G. F. MOORS.
WAGON BRAKE.
No. 570,138.  Patented Oct. 27, 1896.
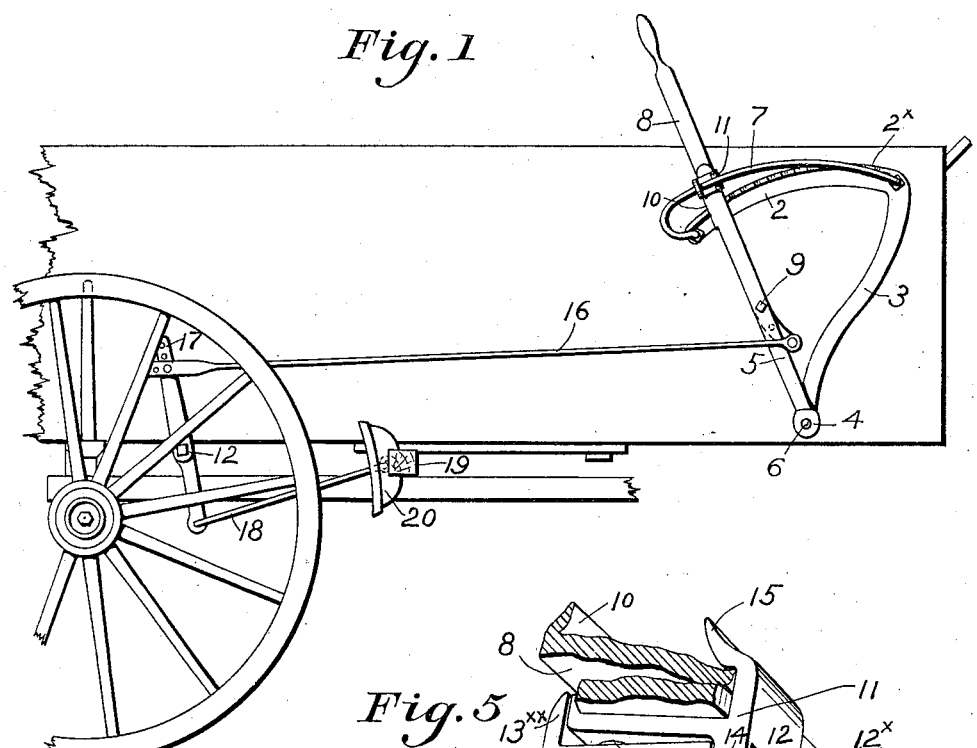
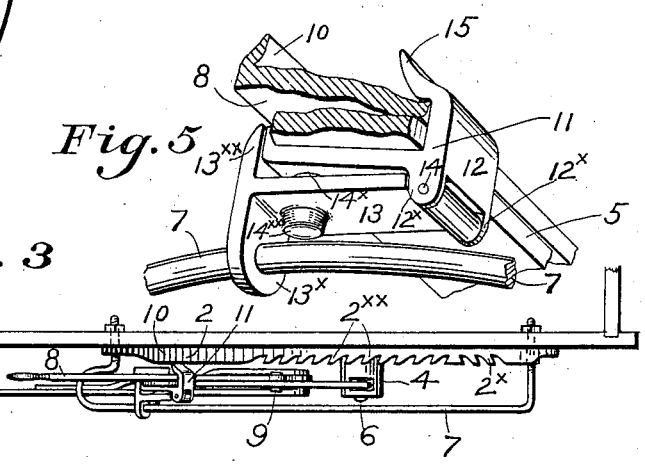
Witnesses:  Inventor:
  Geo. F. Moors
  By his Atty

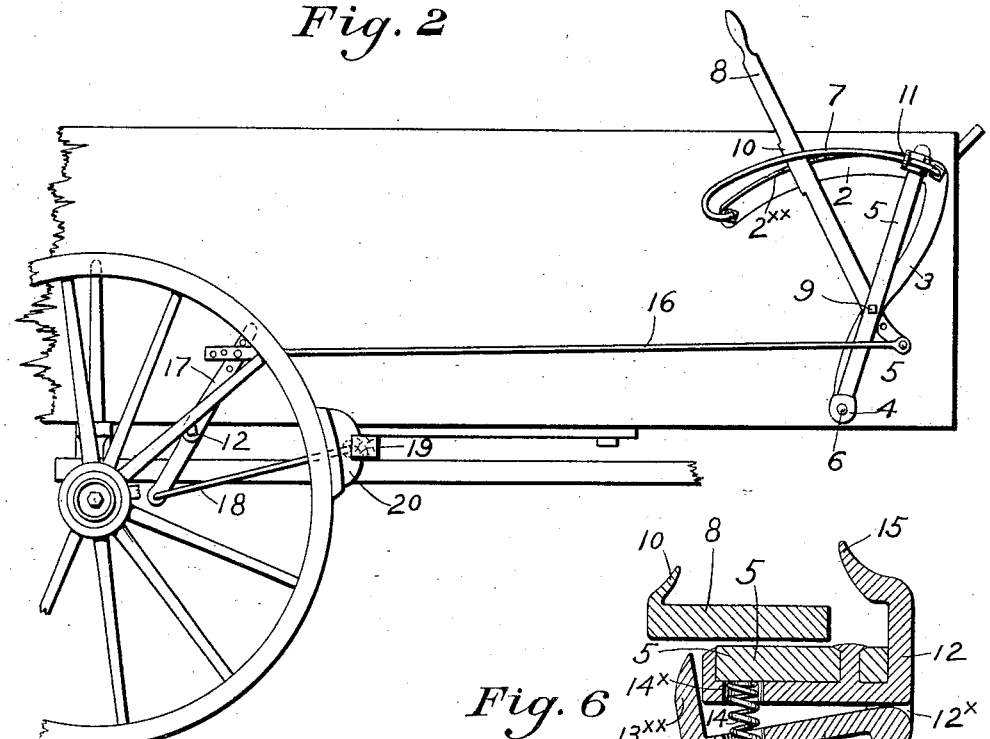
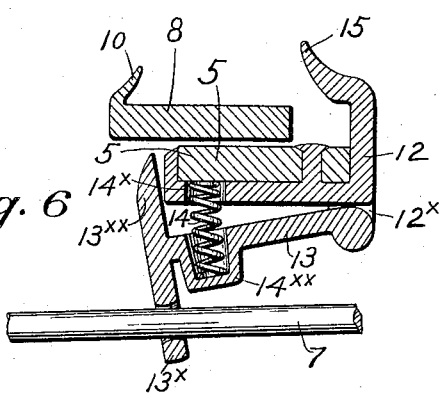
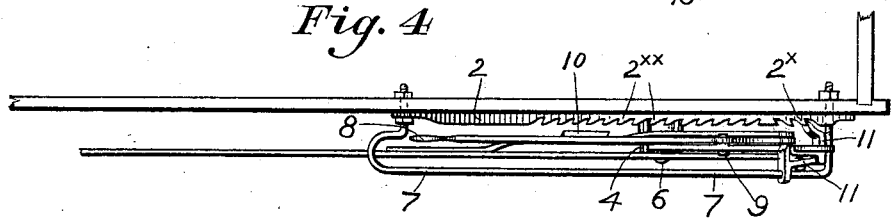

UNITED STATES PATENT OFFICE.

GEORGE F. MOORS, OF OWENSBOROUGH, KENTUCKY, ASSIGNOR OF ONE-HALF TO WILLIAM E. McFARLAND, OF SAME PLACE.

WAGON-BRAKE.

SPECIFICATION forming part of Letters Patent No. 570,138, dated October 27, 1896.

Application filed January 27, 1896. Serial No. 576,937. (No model.)

*To all whom it may concern:*

Be it known that I, GEORGE F. MOORS, a citizen of the United States, residing at Owensborough, in the county of Daviess, State of Kentucky, have invented certain new and useful Improvements in Wagon-Brakes, of which the following is a specification.

The object of my invention is to provide a combination of wagon-brake levers which can be attached to any body or gear brake without altering its present mode of construction; to provide a combination of levers by which the brake-shoe can be thrown off from the wheel any desired distance in order to prevent mud from collecting thereon without diminishing the tightening power or increasing the stroke of the operator's hand; to provide a combination of wagon-brake levers which will effect a more powerful tightening purchase on the brake-shoe and increase the movement of same over that in the ordinary brake without increasing the stroke of operator's hand; to provide a wagon-brake which may be operated quickly by an initial movement of the brake-moving lever to bring the brake first in close proximity to the wheel and by a second movement apply the full power of an ordinary lever exerted to the fullest extent of its movement for applying the brake to the wheel after it has thus been brought to its working position.

A further object of my invention is to reverse the above-described operation in releasing the brake, first by relieving the pressure of the brake upon the wheel by the initial movement of the brake-operating lever and then quickly throwing the brake by a second movement clear of the wheel an ample distance to be secure from the accumulation of mud.

My invention consists, primarily, in two levers, pivoted one upon the other, connecting the former by a rod with the brake and pivotally connecting the latter to the wagon-body in such manner that both levers may be operated together to move the brake the greater distance to and from the wheel and that one of said levers may be operated independently of the other to apply and release the power of the brake upon the wheel.

My invention further consists in certain details of construction, and especially in means for more effectively connecting and operating said levers conjointly and separately, as will hereinafter appear.

In the accompanying drawings, Figure 1 is a side elevation of my improved brake-levers in position with the brake thrown off and showing such parts of a wagon partly broken away as will illustrate the application thereto of my invention; Fig. 2, a similar view thereof with the brake applied to the wheel in close contact and with full force; Fig. 3, an enlarged plan view of the brake-levers and the parts immediately connecting the same with the wagon-body in the position shown in Fig. 1; Fig. 4, a similar view of the same with the said parts in the position shown in Fig. 2; Fig. 5, an enlarged perspective view in detail of the operating-levers, segment guide-bar, and hinged latch-plate for connecting said parts with each other and with the segment rack-bar; Fig. 6, a transverse section of the said levers and hinged latch-plate upon a fragment of the guide-bar and showing one of the operating-levers partly separated from the other and from the said latch-plate.

To the wagon-body 1 is secured a segment-plate 2, having a curved downwardly-projecting arm 3, which terminates in a pocket 4 to receive the lower end of a primary brake operating or moving lever 5, pivoted thereto by bolt 6, which passes through the side-board of the body and through said pocket 4 and serves to hold the latter, together with the arm 3 of the segment-plate, securely thereon. The upper end of said segment-arm, at its junction with forward end of the segment-plate, is secured to the body by the inwardly-bent end of the segment guide-rod 7, which latter passes through said plate and is screw-threaded and fitted with nuts to bear against both sides of the wagon-body. The rear end of the segment-plate 2 is similarly held to the wagon-body by the adjacent rear end of the guide-rod 7, turned inwardly and fitted with a thread and nuts to respectively pass through the plate and body and bear against both sides thereof, whereby the distance of the guide-rod from the segment-rack is adjusted.

The guide-rod 7 is curved to conform to and is held parallel to the segment-plate 2, and the latter has ratchet-teeth, a few of said teeth $2^\times$ at the forward end of the segment-plate to project forwardly and engage with a spur 15 on the latch-plate 11 of the moving-lever 5, and the ratchet-teeth $2^{\times\times}$ on the face of remaining portion of the segment-plate 2 to project rearwardly and engage with the spur 10 on a secondary or power lever 8, as will hereinafter appear.

The brake power-lever 8 is adjustably connected by bolt 9 with the brake-moving lever 5, by which adjustment the tightening power and stroke of the brake-shoe is increased or diminished.

Lever 8 is connected a short distance below the middle of lever 5 to swing freely and independently of said lever across the face of the segment-plate 2 and engage by its spur 10 with the ratchet-teeth $2^{\times\times}$ thereof or to engage with moving-lever 5, by means of a latch-plate 11, and move together therewith across the face of the segment-plate, as will hereinafter appear, to quickly move the brake-block into or out of working position in close proximity to the wheel, the brake-block being acted upon solely by the power-lever 8 when thus brought in the last-named position.

The latch-plate 11 comprises a fixed section 12, of malleable iron, secured by stud-rivets thereon to the moving-lever 5, and a hinged section 13, connected to lugs $12^\times$ thereon, at its forward end, by a stud-pin joint 14, and provided at its free end with a guide-plate $13^\times$ and abutment-plate $13^{\times\times}$, cast integral with and at right angles to the said hinged portion 13 thereof, the guide-plate $13^\times$ having an aperture through which passes the segment guide-rod 7, and the abutment-plate $13^{\times\times}$ serving to engage with power-lever 8 when the latter is pressed outwardly to be drawn back together with the moving-lever 5.

A spiral spring 14 is fitted in a hole $14^\times$ in the rear end of section 12 of the latch-plate, and also in a barrel-socket $14^{\times\times}$ in the hinged section 13 of said latch-plate, the said spring serving to press the section 12 of said latch-plate and the spur 15 thereof into engagement with the forwardly-projecting teeth $2^\times$ of the segment-plate when opposite thereto, thus holding the moving-lever 5 in the position shown in Fig. 2 of the drawings, and when thus engaged the abutment-plate $13^{\times\times}$ is held out of the way to permit the lever 8 to be drawn back, as shown in Fig. 6, to the position shown in Fig. 2 of the drawings.

The lower end or short arm of the power-lever 8 is connected to the forward end of a rod 16, the rear end thereof being adjustably connected to the upper end of a lever 17, secured to a rock-shaft 12, carried on the wagon frame or body, and the lower end of said lever, or a lever secured to and depending from said rock-shaft, is connected by rods 18 with a brake-bar 19, to which are secured brake-blocks 20 in the usual manner.

The operation of my invention is as follows: The brake-levers being in the position shown in Fig. 1, with the brake off, the power-lever 8 is pushed forward, carrying with it the moving-lever 5, fulcrumed at 6 to the segment-arm, and giving a long quick movement to the rod 16 to bring the brake-blocks 20 within close proximity to the wheels and engage the jaw 15 of latch-plate 12, at the upper end of moving-lever 5, with the ratchet-teeth $2^\times$ of the segment-plate. The power-lever 8 with its fulcrum 9 are thus held upon the moving-lever 5 in a forward position ready to be pulled back at its free end with the full pulling strength of the operator to apply the brakes, the upper end of said lever engaging with the segment rack-plate, as above described, to lock the brake when thus applied.

The long sweep of the upper end of lever 5 and the short arm of said lever below its fulcrum is adapted to apply the greatest possible amount of power by means of a hand-lever to the brakes through the very small remaining portion of their movement.

When the brake is to be thrown off, the power-lever 8 is pushed forward until it engages with the latch-plate 11, as shown in Fig. 5, the brake being then just clear of the wheel, and by the outward pressure of power-lever 8 the latch-plate 11 is disengaged from the rack-teeth $2^\times$ and the abutment-plate $13^{\times\times}$ of the hinged section of the latch-plate engages with the power-lever 8 and the said lever together with moving-lever 5 are quickly pulled back to the position shown in Fig. 1, with the brake-block clear of the wheel and at any required distance therefrom.

I claim as my invention and desire to secure by Letters Patent—

1. In a wagon-brake, the combination with the segment-rack having a double set of oppositely-inclined teeth located continuously thereon, a moving-lever carrying a latch-plate at its upper end to engage with one set of said teeth at the forward end thereof and a power-lever fulcrumed upon the moving-lever geared to the brake and adapted to engage with the other set of said segment-teeth, substantially as described.

2. In a wagon-brake, the combination with the moving-lever adapted to be fulcrumed to the body of the wagon, a segment-plate having rack-teeth thereon, a latch-plate comprising a spur-plate and a spring-actuated abutment-plate hinged thereto, and a power-lever fulcrumed on the moving-lever and engaging with the latch-plate and with the rack-teeth of a segment-plate, substantially as described.

3. In a wagon-brake, the combination with the moving-lever adapted to be fulcrumed to the body of the wagon, a segment rack-plate, a latch-plate, a spring-actuated abutment-plate hinged thereto having a guide-plate, a segment guide-rod supporting said guide-plate, and a power-lever fulcrumed to the moving-lever and engaging with the latch-plate and segment rack-plate, substantially as described.

In testimony that I claim the foregoing as my invention I have signed my name in the presence of two subscribing witnesses.

GEO. F. MOORS.

Witnesses:
B. KRUEPER,
T. J. KLOSSOWSKI.